(12) United States Patent
LaTour et al.

(10) Patent No.: US 11,590,574 B2
(45) Date of Patent: Feb. 28, 2023

(54) METHOD FOR MANUFACTURING METAL COMPONENTS USING RECYCLED FEEDSTOCK AND ADDITIVE MANUFACTURING

(71) Applicant: MolyWorks Materials Corp., Los Gatos, CA (US)

(72) Inventors: Andrew VanOs LaTour, Hayward, CA (US); Christopher Paul Eonta, Los Gatos, CA (US); Matthew Charles, Cloverdale, CA (US); Andrew R. Clark, Layton, UT (US); Valentine C. Sackmann, Clearfield, UT (US)

(73) Assignee: MolyWorks Materials Corp., Cloverdale, CA (US)

( * ) Notice: Subject to any disclaimer, the term of this patent is extended or adjusted under 35 U.S.C. 154(b) by 205 days.

(21) Appl. No.: 16/599,378

(22) Filed: Oct. 11, 2019

(65) Prior Publication Data

US 2020/0189000 A1    Jun. 18, 2020

Related U.S. Application Data

(60) Provisional application No. 62/790,103, filed on Jan. 9, 2019, provisional application No. 62/781,107, filed on Dec. 18, 2018.

(51) Int. Cl.
 *B22F 8/00* (2006.01)
 *B33Y 10/00* (2015.01)
 (Continued)

(52) U.S. Cl.
 CPC ............. *B22F 8/00* (2013.01); *B22F 10/25* (2021.01); *B22F 10/28* (2021.01); *B22F 10/73* (2021.01);
 (Continued)

(58) Field of Classification Search
 CPC .... B22F 10/20; B22F 2301/205; B22F 10/70; B22F 8/00; B22F 10/85; B22F 12/00;
 (Continued)

(56) References Cited

U.S. PATENT DOCUMENTS

| 4,750,542 A | 6/1988 | Harker et al. |
| 5,224,534 A | 7/1993 | Shimizu et al. |

(Continued)

FOREIGN PATENT DOCUMENTS

| CN | 104550960 A | 4/2015 |
| WO | WO 2017/203245 A1 | 11/2017 |

OTHER PUBLICATIONS

U.S. Appl. No. 16/135,191, filed Sep. 29, 2018 titled: Deployable Manufacturing Center (PMC) System and Process for Manufacturing Metal Parts, pp. 1-17.

(Continued)

*Primary Examiner* — Anthony M Liang
*Assistant Examiner* — Danny N Kang
(74) *Attorney, Agent, or Firm* — Stephen A. Gratton

(57) ABSTRACT

A method for manufacturing metal components includes the steps of providing a waste feedstock having a selected chemical composition; producing an additive manufacturing (AM) grade alloy powder from the waste feedstock using a cold hearth mixing process; providing an additive manufacturing system; controlling the producing of the alloy powder such that the properties of the alloy powder optimize building of the components using the additive manufacturing system; and building the components using the alloy powder and the additive manufacturing system.

15 Claims, 14 Drawing Sheets

(51) Int. Cl.

| | |
|---|---|
| *B33Y 70/00* | (2020.01) |
| *B22F 10/73* | (2021.01) |
| *B22F 10/25* | (2021.01) |
| *B23K 15/00* | (2006.01) |
| *B22F 10/28* | (2021.01) |
| *B22F 12/53* | (2021.01) |
| *B22F 10/64* | (2021.01) |

(52) U.S. Cl.
CPC .......... *B23K 15/0086* (2013.01); *B33Y 10/00* (2014.12); *B33Y 70/00* (2014.12); *B22F 10/64* (2021.01); *B22F 12/53* (2021.01); *B22F 2301/205* (2013.01)

(58) Field of Classification Search
CPC ......... B33Y 10/00; B33Y 70/00; B33Y 80/00; B33Y 50/02; B23K 15/0086; Y02W 30/50; Y02P 10/25; C22C 1/0458; B29C 64/10; B29C 64/393; B29C 64/20
See application file for complete search history.

(56) References Cited

U.S. PATENT DOCUMENTS

| | | | |
|---|---|---|---|
| 7,754,519 | B1 | 7/2010 | Tolles et al. |
| 8,871,109 | B2 | 10/2014 | Prabhu et al. |
| 9,399,322 | B2 | 7/2016 | Mulliken |
| 9,925,591 | B2 | 3/2018 | Eonta et al. |
| 10,654,106 | B2 | 5/2020 | Eonta et al. |
| 11,235,389 | B2 | 2/2022 | LaTour et al. |
| 2009/0206065 | A1 | 8/2009 | Kruth et al. |
| 2013/0199611 | A1 | 8/2013 | Murali et al. |
| 2014/0048201 | A1 | 2/2014 | Subbaraman et al. |
| 2014/0252685 | A1 | 9/2014 | Stacker et al. |
| 2014/0374933 | A1 | 12/2014 | Flitsch et al. |
| 2015/0020646 | A1 | 1/2015 | Matsuwaka et al. |
| 2016/0052060 | A1* | 2/2016 | Eonta .................. B22F 9/082 75/347 |
| 2016/0053346 | A1 | 2/2016 | Szuromi et al. |
| 2016/0199907 | A1 | 7/2016 | Jarvis et al. |
| 2018/0133804 | A1 | 5/2018 | van Hassel et al. |
| 2018/0169761 | A1 | 6/2018 | Eonta et al. |
| 2019/0119787 | A1 | 4/2019 | Cotton et al. |
| 2020/0086390 | A1 | 3/2020 | LaTour et al. |
| 2021/0008621 | A1 | 1/2021 | Eonta et al. |

OTHER PUBLICATIONS

International Application No. PCT/US 20/ 41106, The International Search Report and the Written Opinion of the Internatinoal Searching Authority, dated Dec. 18, 2020, pp. 1-14.

Tootooni et al., Classifying the Dimensional Variation in Additive Manufactured Parts From Laser-Scanned Three-Dimensional Point Cloud Dat Using Machine Learning Approaches:, Journal of Manufacturing Science and Engineering, vol. 139, No. 9, 2017.

LaTour, "Processing of Metallic Scrap Materials for Battlefield Additive Manufacturing." SBIR.gov, www.sbir.gov/sbirsearch/detail/1256429, pp. 1-2, Award start date Aug. 1, 2016.

International Application No. PCT/US19/41906, International Search Report and Written Opinion of the International Searching Authority, dated Oct. 22, 2019, pp. 1-11.

Pepi, M. et al., Manufacturing at the Point of Need Using Recycled, Reclaimed, and/or Indigenous Materials, DSIAC Journal, vol. 5, No. 3, Summer 2018, pp. 26-37.

Abstract SBIR contract solicitation No. 2016.1, "Processing of Metallic Scrap Materials for Battlefield Additive Manufacturing", proposal award date Aug. 1, 2016, pp. 1-3.

International application No. PCT/US 19/62111, International Search Report and the Written Opinion of the International Searching Authority, or the Declaration, dated Feb. 27, 2020, pp. 1-11.

* cited by examiner

METHOD FOR MANUFACTURING METAL COMPONENTS USING RECYCLED FEEDSTOCK AND ADDITIVE MANUFACTURING

CROSS REFERENCE TO RELATED APPLICATION

This application claims priority from U.S. Provisional No. 62/781,107, filed Dec. 18, 2018, and to U.S. Provisional No. 62/790,103, filed Jan. 9, 2019, both of which are incorporated herein by reference.

GOVERNMENT LICENSE RIGHTS

This invention was made with government support under Contract FA8222-18-P-0005, awarded by the US Air Force. The government has certain rights in the invention.

FIELD

This disclosure relates to a method for manufacturing metal components using high temperature metal alloys fabricated from a variety of waste feedstocks.

BACKGROUND

Working metals into alloys has been done throughout human history. High temperature alloys are a very recent discovery. These metals are being utilized in industries that need materials to withstand high temperatures, such as airplane engines, turbine blades, and chemical processing equipment. However, the high heat tolerance of these metals makes recycling difficult to accomplish. Current recycling technologies, while successful, are not efficient enough for today's industry requirements.

In addition, the minerals containing the metals needed to make high temperature metal alloys must be imported into the United States due to these mineral deposits not being present on US soil. This makes optimizing the metal recycling process essential for reducing international dependence on obtaining these valuable metals.

In view of the foregoing, there is a need in the art for improvements in recycling processes for high temperature metal alloys. This disclosure relates to a method for recycling high temperature metals from a variety of waste feedstocks, which are converted into an additive manufacturing (AM) grade powder, and then into metal alloy components, such as aircraft components.

SUMMARY

A method for manufacturing metal components includes the initial step of providing a waste feedstock having a selected chemical composition. Exemplary waste feedstocks include failed builds, broken parts, prototype parts, support structures, and used powder. For manufacturing components out of a titanium based alloy, recycled aircraft components can be used as the waste feedstock.

The method also includes the step of producing an additive manufacturing (AM) grade alloy powder from the waste feedstock using a cold hearth mixing process. In cold hearth mixing, a heat source, such as a plasma torch or an electron beam is used to heat raw materials into a molten material, which is then atomized into a powder. Composition correction can also be performed using additives. For example, during production of the alloy powder, the composition of the molten waste feedstock can be adjusted to achieve a particular composition of metal alloy. In exemplary embodiments, titanium-based alloy powders are produced.

The method also includes the steps of providing an additive manufacturing system, and controlling the producing of the alloy powder such that the properties of the alloy powder optimize building of the components using the additive manufacturing system. In exemplary embodiments, the additive manufacturing system can utilize laser powder bed fusion (LPBF) technology, laser metal deposition (LMD) technology or electron beam melting (EBM) technology. With each technology, the properties of the alloy powder produced from the waste feedstock are engineered to satisfy the requirements of the additive manufacturing system.

The method also includes the step of building the components using the additive manufacturing (AM) grade alloy powder and the additive manufacturing system. In an additive manufacturing system that uses laser powder bed fusion (LPBF), one or more lasers fuse powder particles together layer by layer. After each layer of the part is built, another layer of powder is dispensed over the surface, which is subsequently fused by the laser. The resulting part is cut from a build plate, allowing excess powder to fall away and be recycled. In an additive manufacturing system that uses laser metal deposition (LMD), molten powder is deposited directly onto a substrate. Laser metal deposition (LMD) differs from laser powder bed fusion (LPBF) in the way powder is delivered. In (LPBF), a laser melts powder that is lying stationary in a powder-bed. A hopper dispenses powder across the bed and the part is built in layers. In contrast, (LMD) uses a stream of powder which is melted by a laser as it travels from the nozzle to the substrate. In an additive manufacturing system that uses electron beam melting (EBM), an electron beam and lens system are used to melt and fuse powder particles in layers on a build plate.

Following the building step, the method can also include the steps of heat treating the components, machining the components and testing the components.

BRIEF DESCRIPTION OF THE DRAWINGS

Exemplary embodiments are illustrated in the referenced figures of the drawings. It is intended that the embodiments and the figures disclosed herein be to be considered illustrative rather than limiting.

DETAILED DESCRIPTION

Figure 1:
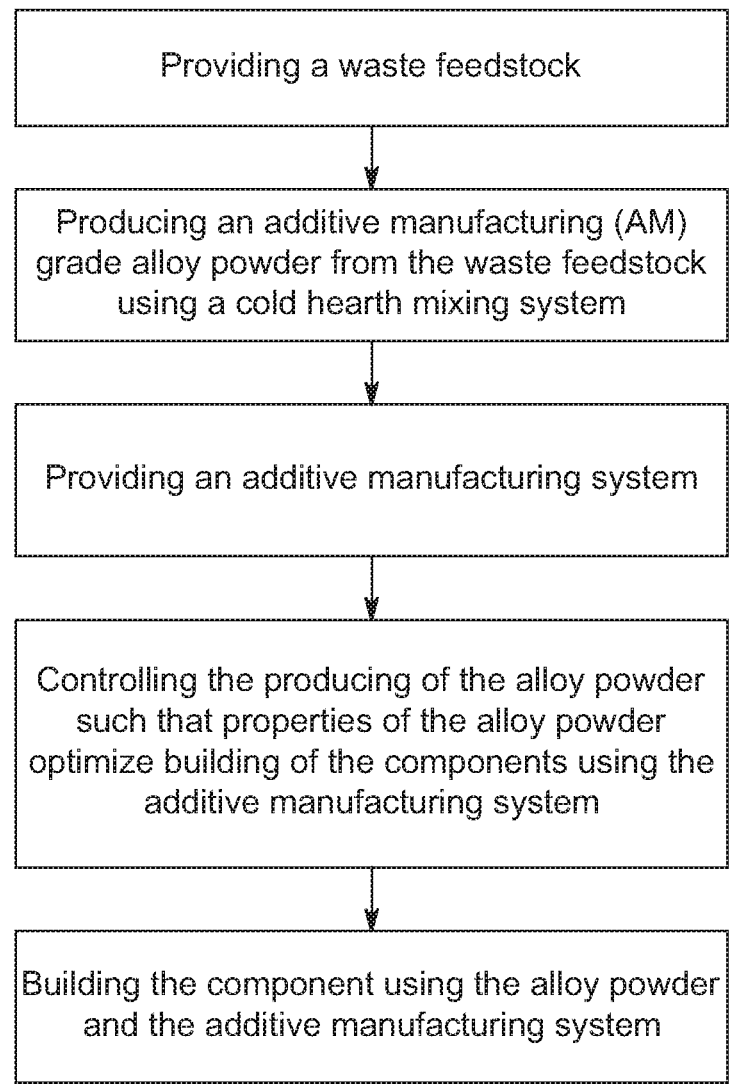
FIG. 1 is a flow diagram illustrating steps in a method for manufacturing metal components.
Figure 2A:
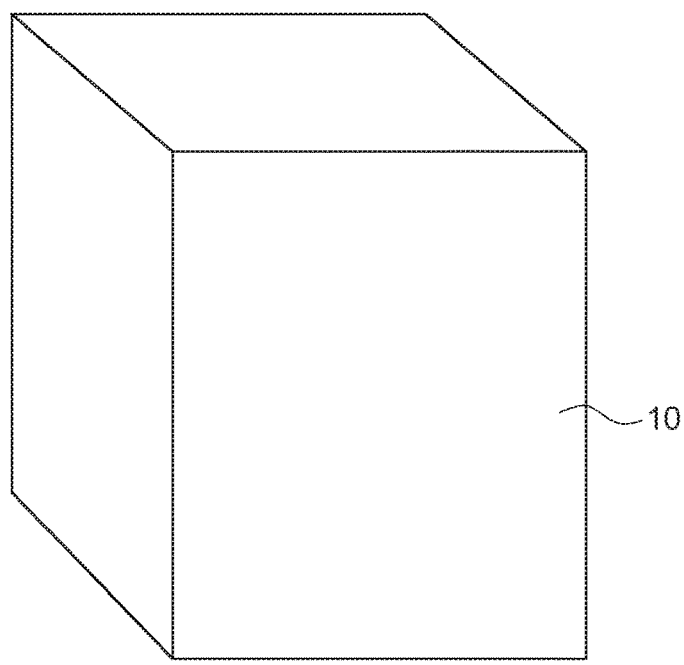
FIG. 2A is a schematic view of a waste feedstock used with the method.

Referring to FIGS. 1 and 2A-2D, steps in a method for manufacturing metal components are illustrated. As shown in FIG. 2A, an initial step in the method comprises providing a waste feedstock 10. Exemplary waste feedstocks 10 include failed builds, broken parts, prototype parts, support structures, and used powder. Titanium, although relatively rare, can be found in aircraft components. In addition, wherever metal parts are expended, steel, stainless steel, aluminum, and copper can be found. U.S. patent application Ser. No. 16/135,191, which is incorporated herein by reference, discloses a deployable manufacturing center (DMC) system for providing the waste feedstock 10.

By way of example, for providing the waste feedstock 10, large pieces of metal scrap can be collected, analyzed by a handheld XRF, and cut to pieces smaller than 6" in diameter. Small fragments of scrap materials are usually not collected due to lower yield, greater variations in alloy composition, and increased likelihood of contamination. Hazardous components, such as radioactive materials, toxic materials such as asbestos, or metals such as beryllium, cadmium, and mercury pose dangers to personnel and are removed from the feedstock 10 before processing. In addition, chemical analysis of the waste feedstock 10 can be performed to predict elements needed for correction of the final composition to the desired alloy. Ideally, a batch is composed of scrap from a single source material. This makes the composition relatively easy to predict and correct. When the waste feedstock is inconsistent, however, predictive analysis is not sufficient. For inconsistent waste feedstock, a post-melt chemical analysis can be performed to determine the composition of the material. After the mixed-scrap composition is determined, the alloy can be corrected to its desired composition.

Figure 2B:
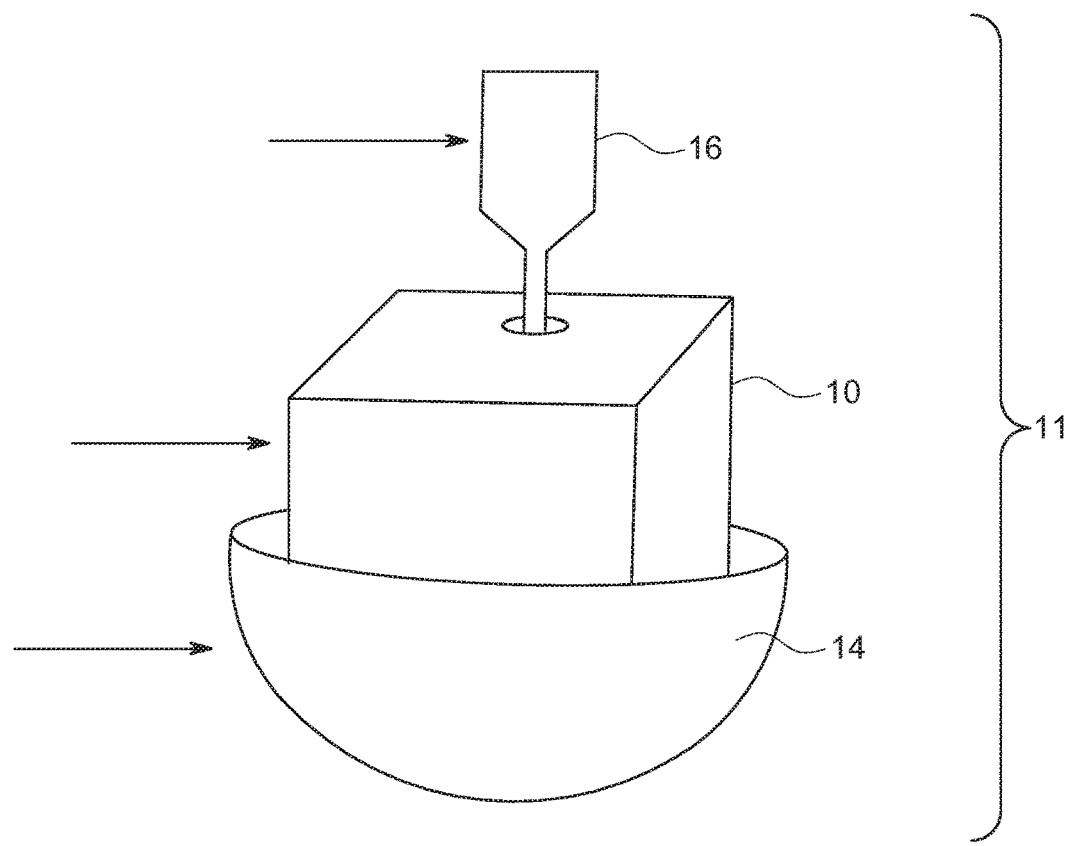
FIG. 2B is a schematic view illustrating a cold hearth mixing system used with the method.
Figure 2C:
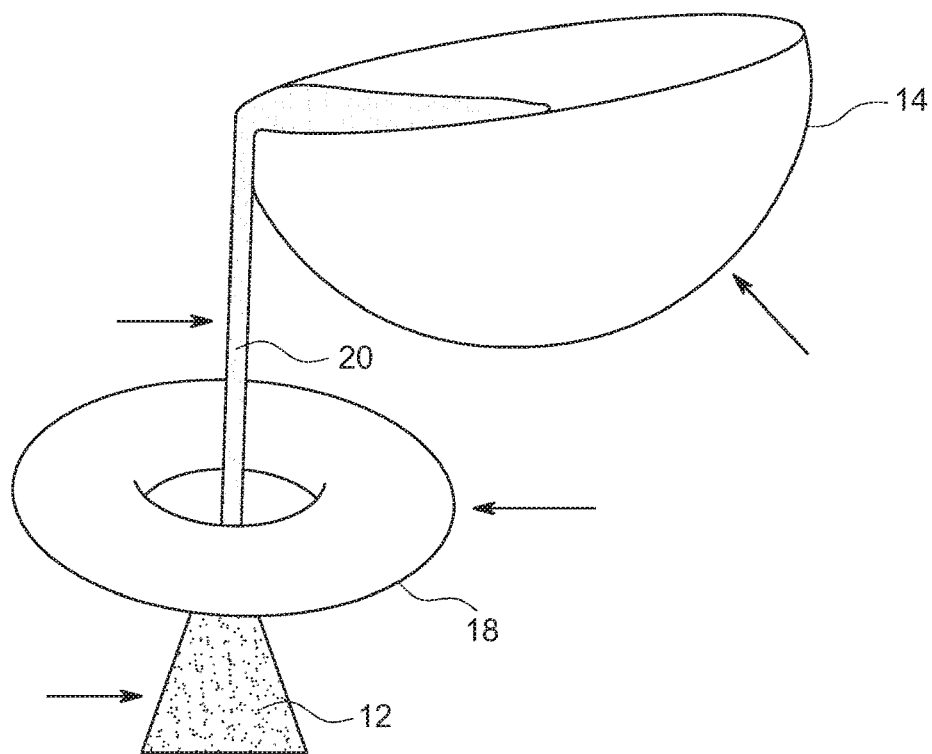
FIG. 2C is a schematic view illustrating an atomization system used with the method during production of an alloy powder.
Figure 2D:
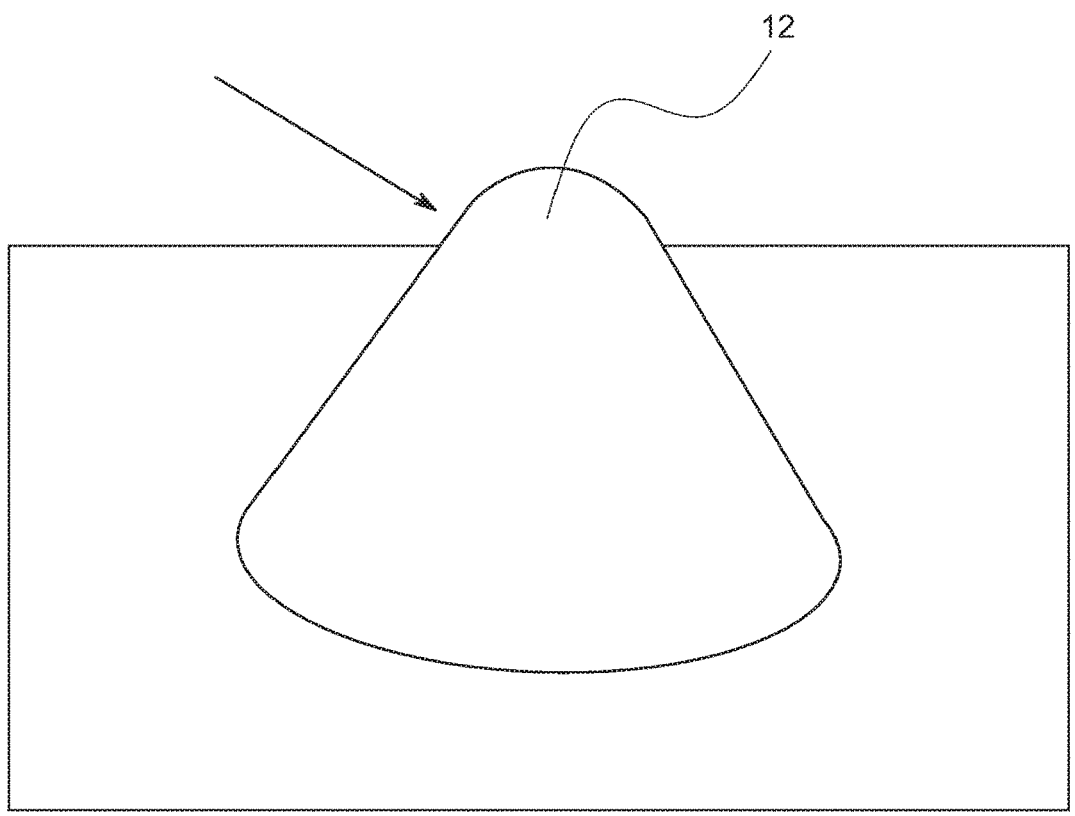
FIG. 2D is a schematic view illustrating the alloy powder produced by the method.

As shown in FIGS. 2B-2D, the method also includes the step of producing an additive manufacturing (AM) grade alloy powder 12 (FIG. 2D) from the waste feedstock 10 using a cold hearth mixing process performed using a cold hearth mixing system 11 (FIG. 2B). As shown in FIG. 2B, the cold hearth mixing system 11 includes a heat source 16, such as a torch, and a mixing cold hearth 14. As shown in FIGS. 2B and 2C, during the cold hearth mixing process, the heat source 16 and the mixing cold hearth 14 (FIG. 2B) are operated to produce a molten metal 20 having a uniform composition, with composition correction performed if necessary.

U.S. Pat. No. 9,925,591 B2, which is incorporated herein by reference, discloses exemplary cold hearth mixing systems. For example, the mixing cold hearth 14 (FIG. 2B) can include fluid cooled walls, a melting cavity configured to hold the waste feedstock 10 (FIG. 2B) and the molten metal 20 (FIG. 2C), and an induction coil (not shown) configured to generate an electromagnetic field for stirring and heating the molten metal 20 (FIG. 2C). The mixing cold hearth 14 (FIG. 2C) can also include a mechanical drive (not shown) configured to mount and move the mixing cold hearth 14 (FIG. 2C) for mixing the molten metal 20 (FIG. 2C) in the melting cavity and to rotate the mixing cold hearth 14 (FIG. 2C) for pouring the molten metal from the melting cavity. Movement of the mixing cold hearth (FIG. 2C) 14 by the mechanical drive can include both oscillatory motion and rotational motion or a combination thereof. The mixing cold hearth 14 (FIG. 2C) can also include a skull (not shown) at least partially lining the melting cavity and configured to provide a heat transfer boundary for the molten metal 20 (FIG. 2C). In addition, the mixing cold hearth 14 (FIG. 2C) can comprise a removal element of an assembly of interchangeable mixing cold hearths, with each mixing cold hearth 14 of the assembly configured for melting a specific category of raw material to produce a specific product. In the mixing cold hearth 14 (FIG. 2C) composition correction can optionally be performed by adding additives to a known material of undesirable composition to create a new material of a desired composition. The cold hearth mixing process is thus controlled to provide the material for making the alloy powder 12 with an exact chemical composition.

Following processing in the mixing cold hearth 14 (FIG. 2B), an atomization process can be performed using a gas atomization system 18 (FIG. 2C) to form the alloy powder 12 (FIG. 2D). Previously cited U.S. Pat. No. 9,925,591 B2 discloses exemplary gas atomization systems. For example, atomization can be performed by pouring the molten metal 20 (FIG. 2C) across a die that produces turbulent high-velocity gas in a sharp stream. The stream of turbulent high-velocity gas disintegrates the molten stream and produces spherical metal particles that are cooled rapidly in flight as they travel through an atomization chamber. As it is cooling in flight, the metal powder solidifies and is transferred into a cyclone (not shown) where it is collected as the alloy powder 12 (FIG. 2D). As other examples, atomization can be performed with plasma gas, a spinning disk, a vibratory plate, or another method that disintegrates the molten metal into fine particles. Preferably, the atomization process is controlled such that the resulting particle size of the alloy powder 12 (FIG. 2D) can be between 0-350 um. In one embodiment, the alloy powder 12 (FIG. 2D) has a particle size of 10-160 um. In another embodiment, a particle size of 25-50 um is produced.

Following the atomization process, the alloy powder 12 (FIG. 2D) can be analyzed by the SEM analysis apparatus to confirm particle size, microstructure, and elemental composition. Characterization of the alloy powder 12 (FIG. 2D) can include analysis of particle size, size distribution, morphology, density, phase behavior, elemental composition and surface characteristics. Purity, morphology, and defect-free microstructure can also be confirmed upon characterization, as well as avalanche angle and surface fractal. All of these characteristics can be selected to satisfy the requirements of the additive manufacturing system 22A (FIG. 3) or 22B (FIG. 6A).

Figure 3:
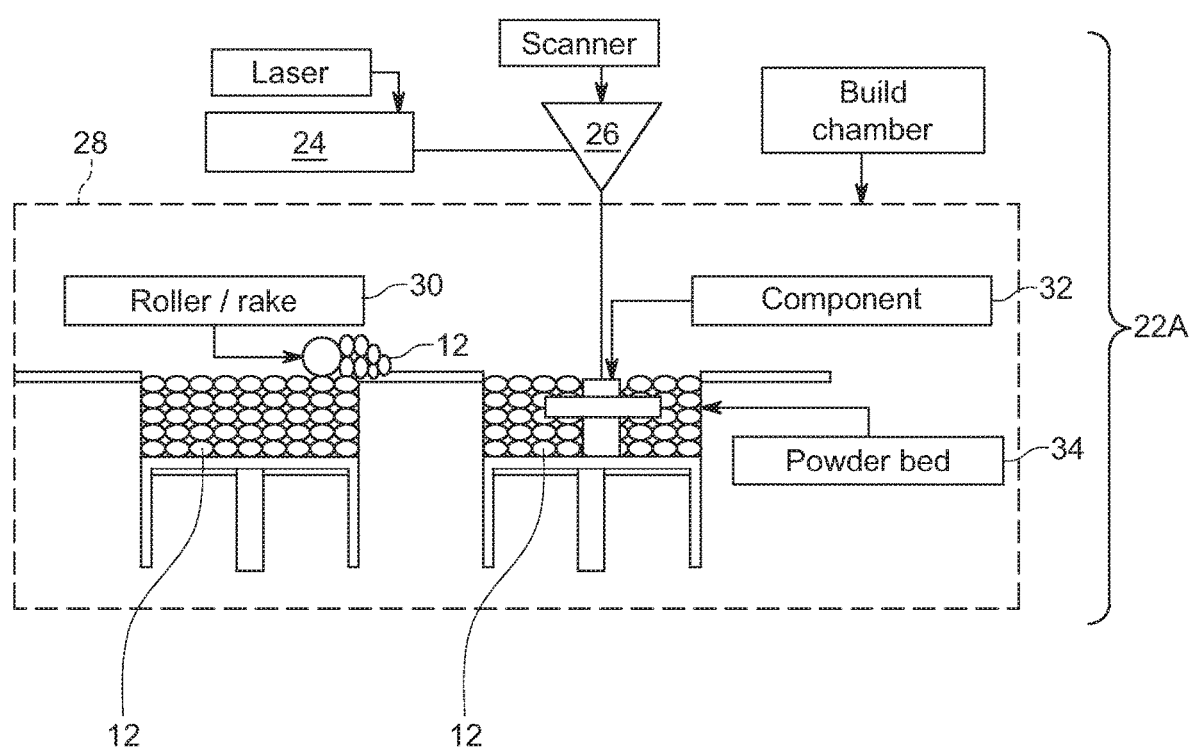
FIG. 3 is a schematic view illustrating an additive manufacturing system that includes a laser powder bed fusion (LPBF) system for performing a building step of the method.
Figure 6A:
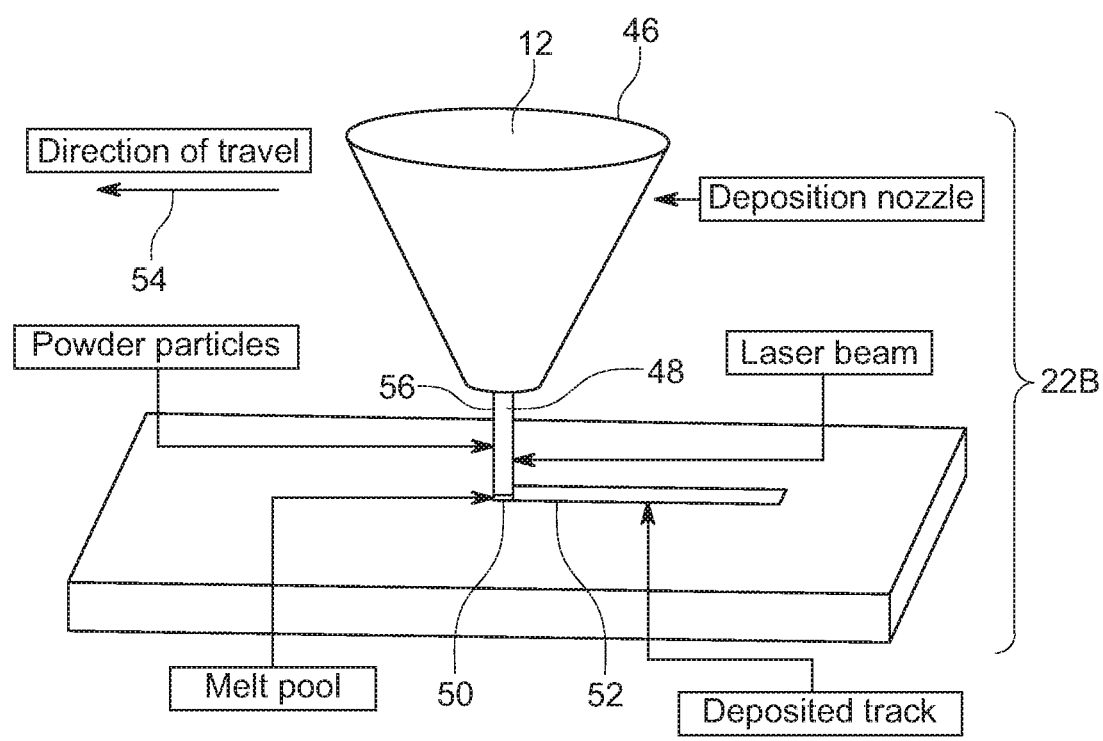
FIG. 6A is a schematic view illustrating an additive manufacturing system that includes a laser metal deposition (LMD) system for performing a building step of the method.

Referring again to FIG. 1, the method also includes the step of building the components using the additive manufacturing (AM) grade alloy powder 12 (FIG. 2D) and an additive manufacturing system 22A (FIG. 3) or 22B (FIG. 6A). In a first embodiment, the additive manufacturing system 22A (FIG. 3) employs laser powder bed fusion (LPBF) technology. As shown in FIG. 3, the additive manufacturing system 22A can include a laser 24, a scanner 26, and a build chamber 28. Within the build chamber 28 are a powder bed 34 and for containing the alloy powder 12 and a roller rake 30 for conveying the alloy powder 12 into the powder bed 34 for building the components 32.

Figure 6B:
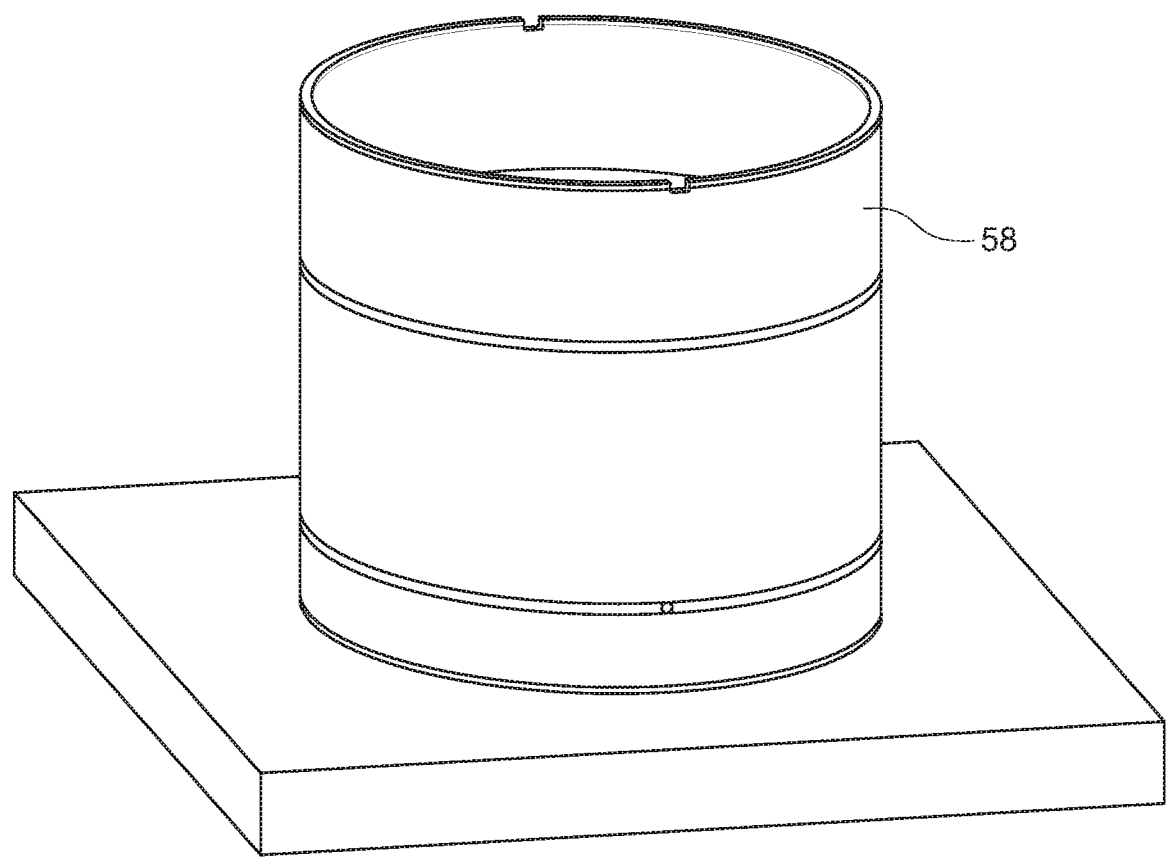
FIG. 6B is an enlarged side elevation view of a laser head of the laser metal deposition (LMD) system shown in FIG. 6A.

In a second embodiment, the additive manufacturing system 22B (FIG. 6A) employs laser metal deposition (LMD) technology. Laser Metal Deposition (LMD) is a type of additive manufacturing which deposits molten powder directly onto a substrate. It is different from powder-bed fusion in the way powder is delivered. In LPBF, a laser melts powder which is lying stationary in a powder-bed. A hopper dispenses powder across the bed and the part is built in layers. In contrast, LMD uses a stream of powder which is melted by a laser as it travels from the nozzle to the substrate. LMD can be used for building new parts and part repairs. The powder used in LMD has a particle size range of 75-150 μm, which is too large for LPBF. As shown in FIG. 6A, the additive manufacturing system 22B includes a deposition nozzle 46 in flow communication with a quantity of the alloy powder 12 and configured for movement in a direction of travel 54. The deposition nozzle 46 produces moving powder particles 56 that are melted by a laser beam 48 emanated from a laser head 58 (FIG. 6B) to form a melt pool 50 and a deposited track 52.

Figure 4A:
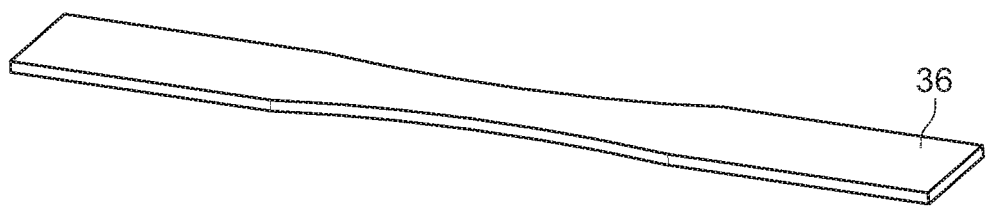
FIG. 4A is a perspective view of a landing gear coupon component built by the system of FIG. 3 using the method.
Figure 4B:
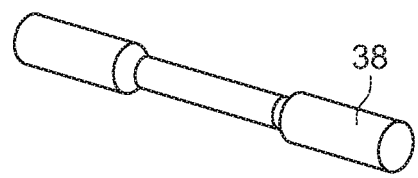
FIG. 4B is a perspective view of a subscale component built by the system of FIG. 3 using the method.

In the examples to follow, landing gear coupon components 36 (FIG. 4A) and subscale components 38 (FIG. 4B) were made by additive manufacturing (AM) using the alloy powder 12 (FIG. 2D). Using the previously described method, Titanium 10-2-3 alloy powder was produced by MolyWorks Materials Corporation at its R&D facility in Cloverdale, Calif. Alloy powder production was performed via a cold hearth mixing process as previously described using certified scrap feedstock. In the examples to follow, the alloy powder 12 had particle sizes up to 75 μm and the additive manufacturing system included an M100 printer. Ti 10-2-3 alloy powder was tested in-house for oxygen and hydrogen, and sent out for analysis to Anamet Inc., a third-party laboratory specializing in materials analysis (located in Hayward, Calif.). Oxygen content of the alloy powder ranged from 0.14% to 0.22%. The average oxygen content of the alloy powder 12 was 0.18% with a CV of 14.1%. The oxygen added by the foundry was in the range of 400-800 ppm, with final oxygen content of the alloy powder 12 typically between 0.16% and 0.2%. For one lot of alloy powder 12, an analysis from Anamet showed that oxygen content was 0.12%, meeting industry specifications for Titanium.

Manufacturing process parameters were developed for Titanium 10-2-3 and Ti 6-4. Destructive and nondestructive tests were used to generate mechanical properties, microstructure, and chemical composition data. Results indicate that coupon components 36 and subscale components 38 fabricated using the alloy powder 12 and an additive manufacturing (AM) process have substantially lower high-cycle fatigue strength compared to wrought material (40 vs 90 ksi at runout, respectively). Low-cycle fatigue strength of the coupon components 36 (FIG. 4A) and subscale components 38 was also lower than for equivalent wrought components (1000 cycles to failure at 0.75% strain for coupon components vs 1% strain for equivalent wrought components). However, there was significant overlap in the data for the components formed by the present method using recycled feedstock used to produce the alloy powder 12. Failure analysis and optical microscopy revealed that the coupon components 36 and subscale components 38 showed microstructural differences when compared to equivalent wrought components, such as larger grains and smaller dimples in the fracture surfaces. Subscale part manufacturing tests indicate that the present method is capable of producing at least seven unique landing gear parts whose production has become obsolete.

Example 1

In this example, the additive manufacturing system included a 3-D printer in the form of a modified EOS M100 3D-Printer manufactured by EOS GmbH Electro Optical Systems. Fatigue coupons were designed to fit the usable build platform of the M100 and meet ASTM standards. Work was performed with 3DXpert to design build plates and support structures. Files were designed in CAD and converted to 3DXpert, where support structures and tolerances were added. Before printing, 3DXpert files were exported (as .stl files) to EOS Print for positioning on the build platform.

Coupons were prepared in both vertical and horizontal orientations to test the capabilities of the EOS M100. The EOS100 required extensive modifications to function as an additive manufacturing system for performing the present method. For example, prior to modifications the usable build volume was found to be approximately 25% of the actual build volume, and the powder hopper was found to be too small to feed a full build plate. Horizontal builds were limited in size due to problems with the powder dispensing system—powder was not dispensed evenly from the hopper. The typical oxygen added to titanium parts by the M100 during the reporting period was 400-600 ppm. Further oxidation of powder was observed due to overheating of overhangs when no support structures were present. Oxidation problems may be attributed to the inert gas purge system which allows 1000 ppm of oxygen to remain in the build chamber during printing. A vacuum system could reduce the oxygen added to as low as 25 ppm.

The average production rate of the M100 was around 3 coupons per day. Round samples presented challenges when printed in the horizontal orientation. Problems arose from the overhang of the rounded sides, requiring addition of support material. When not firmly supported, parts printed in the horizontal orientation curled away from the build plate due to vertical residual stresses. When support structures were added to compensate for residual stress, the support structures created difficulties in subsequent machining. Closely spaced support material compounded the difficulties of removal in machining.

Figure 5A:
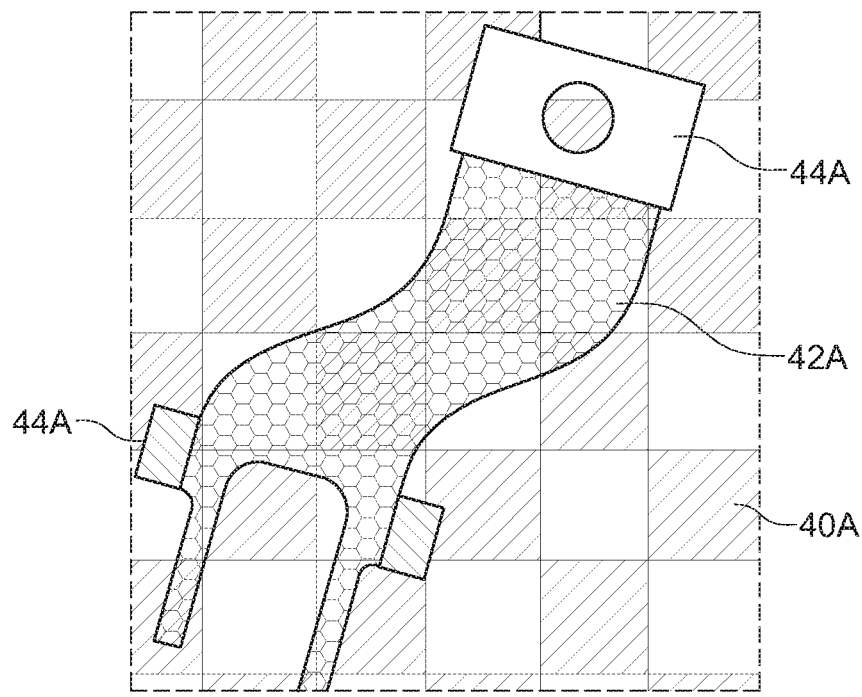
FIGS. 5A-5E are schematic views illustrating build plates and support structures for performing a building step of the method.
Figure 5B:
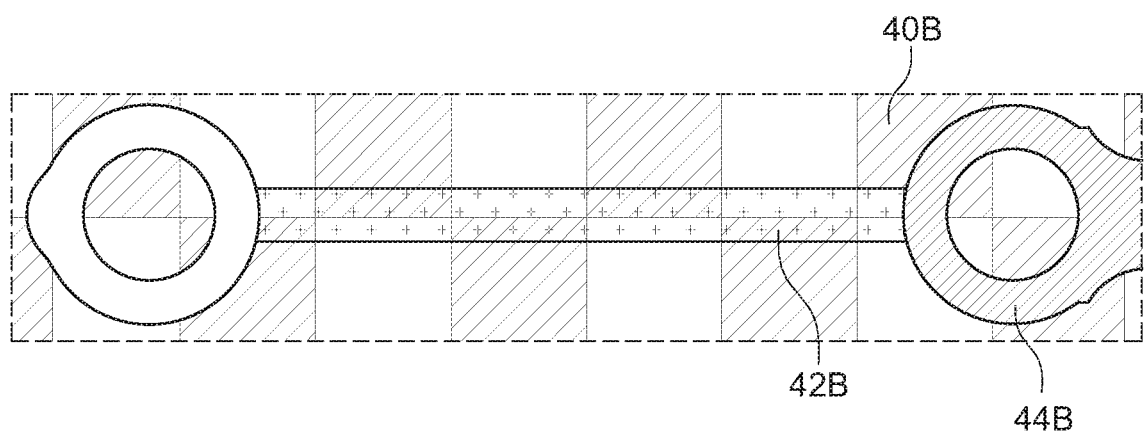
Figure 5C:
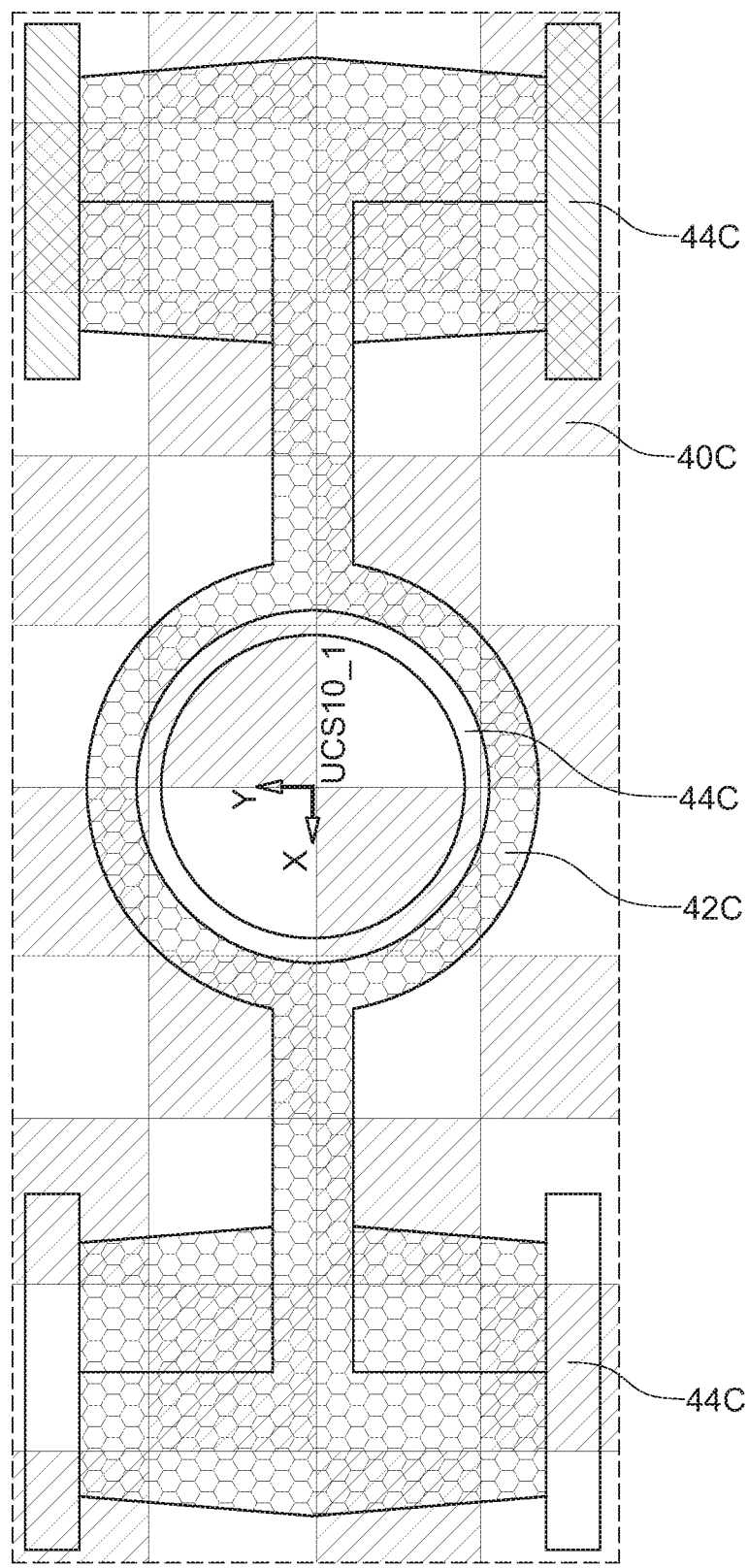
Figure 5D:
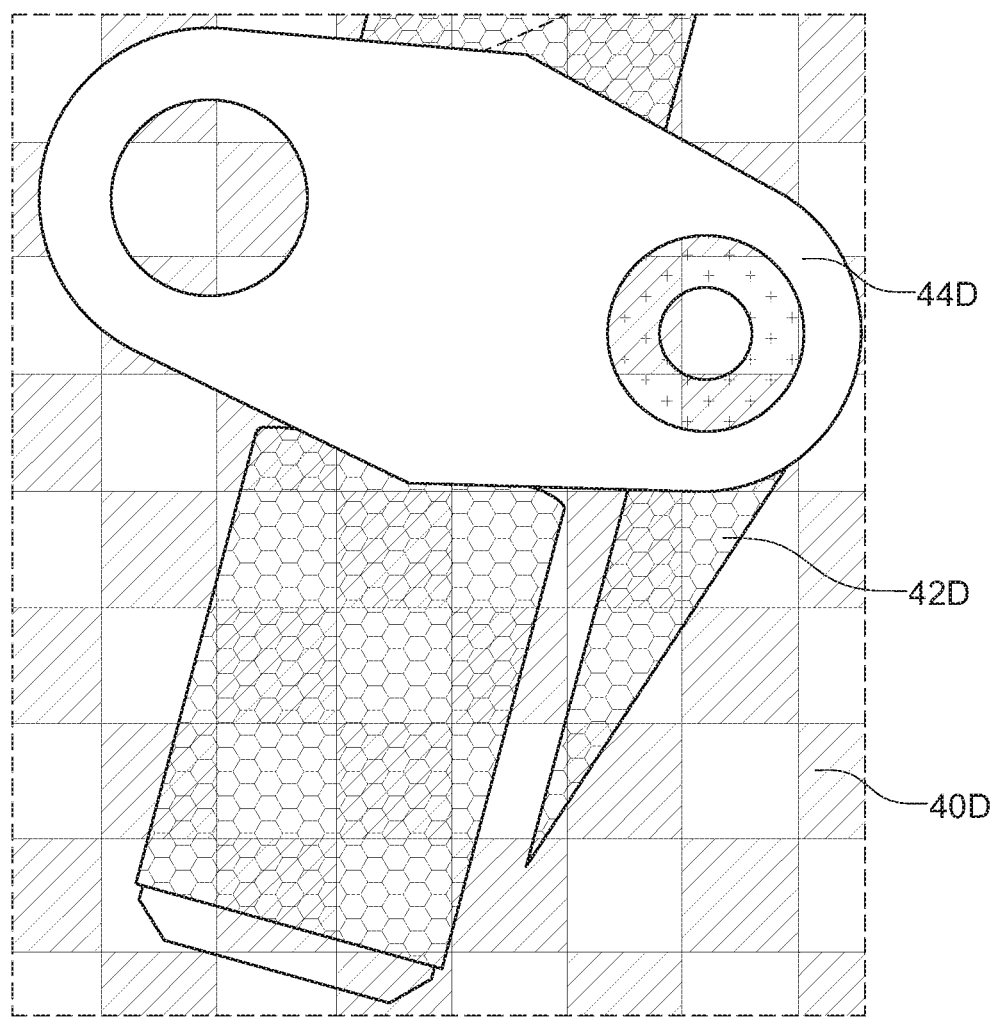
Figure 5E:
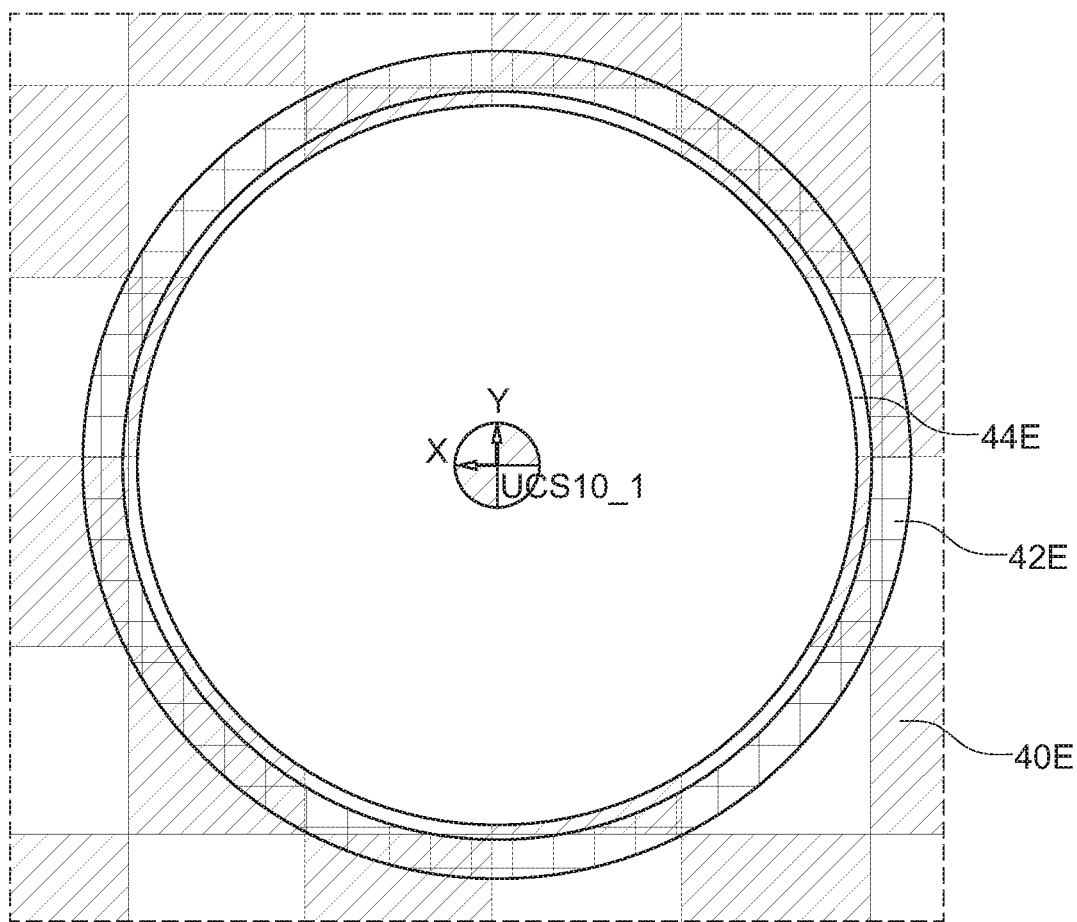

FIGS. 5A-5E illustrate exemplary build plates 40A-40E, build areas 42A-40E and support structures 44A-44E for performing the building step. In FIGS. 5A-5B the build plates 40A-40E are represented by the checkered patterns, the build areas 42A-42E are represented by the honeycomb patterns (or plus minus patterns) and the support structures 44A-44E by solid lines. In FIG. 5A, solid supports 44A that are slightly wider than the base of the component were used. The supports 44A were extruded down 4 mm from the bottom of the part to enable the build plate 40A to be removed from the component. This method was used for all parts which utilized solid supports. Honeycomb build areas 42A and solid supports 44A were used for the bottom. The honeycomb had a distance of 2 mm and an external wall. Texture 2-S was used. The solid supports 44A used were mated against flat surfaces on the component (e.g. coupon component 36—FIG. 4A) or subscale part component 38 (FIG. 4B) to facilitate removal. In FIG. 5B, a plus minus build area 42B and solid supports 44B on a build plate 40B were employed. All of the build areas 42B beneath and between the supports used a plus-sign pattern with a distance of 3 mm and an external wall. The bottom supports 44B used texture 1-S. In FIG. 5C, honeycomb build areas 42C and supports 44C on a build plate 40C were utilized. External walls were removed from several areas to ease removal of support structures after printing. The center solid support 44C required removal by drilling. Honeycomb build areas 42C surrounding the circle had a distance of 2 mm. Honeycomb dimensions of the external walls were 2.5 mm. The remaining honeycomb build areas 42C were set at 3 mm. The four supports 44C on the corners were solid, with a small latticed center to provide rigidity. The build areas 42C on the two outside holes were honeycomb, with a distance of 3 mm. External walls were utilized on some supports and omitted from others for ease of removal and surface finish. The support material for the cross-holes (from each side hole to the center hole) was plus signs with a distance of 4 mm, with external walls eliminated for ease of removal. No textures were utilized for the walls of the supports. In FIG. 5C, the supports 44C were square grid and solid. The square grid had a distance of 3 mm and an external wall with Texture 2-S. In FIG. 5D, solid supports 44D and honeycomb build areas 42D on a build plate 40D were used. All honeycombs for this part had a distance of 3 mm. In FIG. 5E, cylindrical solid supports 44E, square grid build area 42E and build plate 40E were used. The square grid had a distance of 3 mm, an external wall with Texture 2-S, and selected cell properties.

Example 2

Figure 7A:
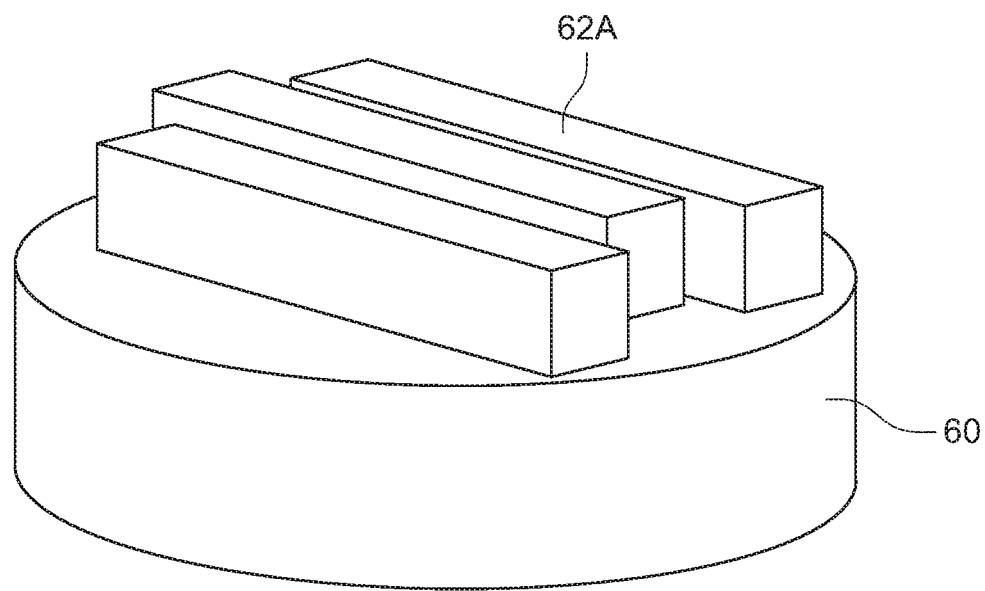
FIGS. 7A and 7B are schematic views illustrating build plates after printing using the laser metal deposition (LMD) system shown in FIG. 6A.
Figure 7B:
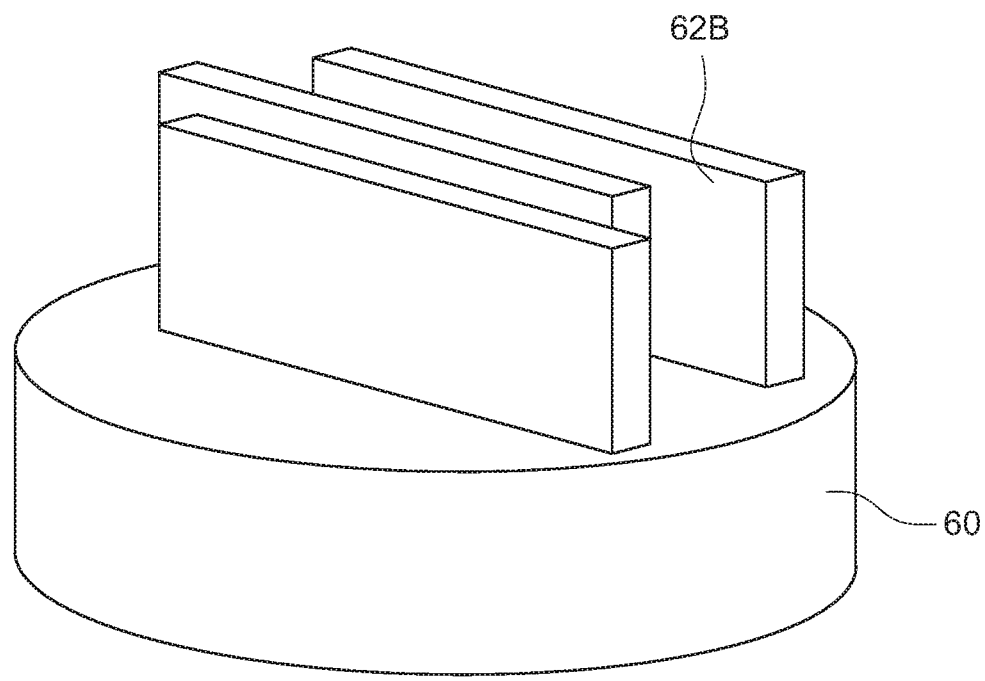
Figure 8A:
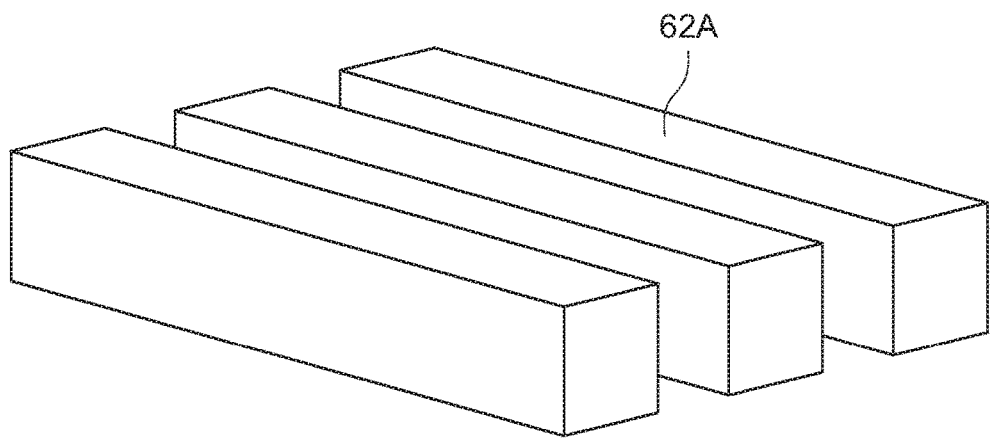
FIGS. 8A and 8B are schematic views illustrating printed blocks after printing using the laser metal deposition (LMD) system shown in FIG. 6A.
Figure 8B:
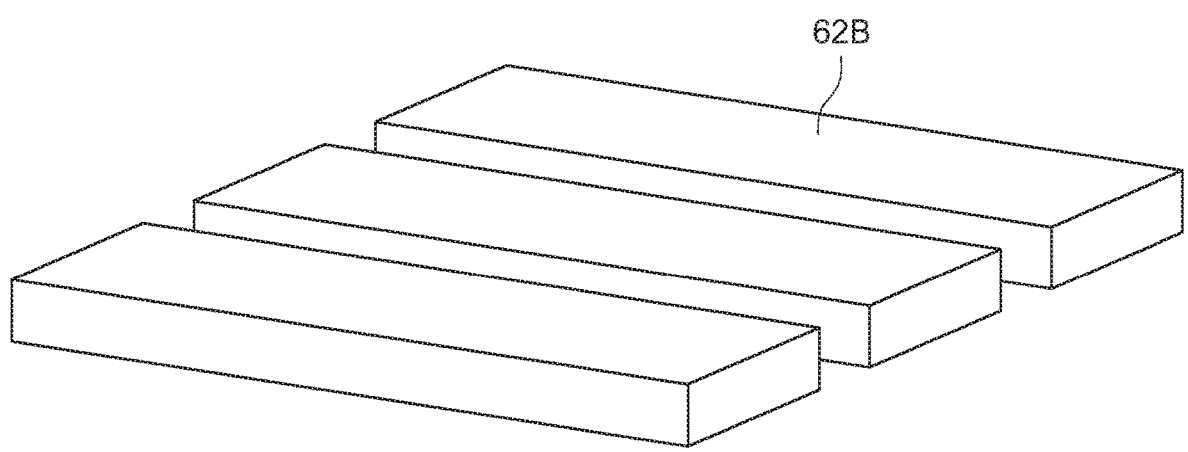

In Example 2, the additive manufacturing system 22B (FIGS. 6A-6B) included laser metal deposition technology. FIGS. 7A and 7B are schematic views illustrating a build plate 60 after printing of block components 62A, 62B using the laser metal deposition (LMD) system shown in FIG. 6A. FIGS. 8A and 8B are schematic views illustrating printed block components 62A, 62B after printing using the laser metal deposition (LMD) system shown in FIG. 6A.

Alloy powder production was performed via a cold hearth mixing process as previously described using certified scrap feedstock. In this example, Ti 10-2-3 alloy powder 12 was produced in a size range of 75-150 μm. Alloy powder 12 with particle sizes in the 75-150 μm range was sent to Formalloy (Spring Valley, Calif.) for printing of a landing gear part on an L-series LMD system. Although prior art parts are typically made from Ti 6-4, in this example the part was built using Ti 10-2-3.

Oxygen and hydrogen were measured at each step in the process. The data was collected using an Eltra Elementrac ONH-p. The alloy powder 12 was analyzed, printed into pins, and analyzed again. The results indicate that the oxygen added to titanium parts was approximately 400-600 ppm.

Ti 10-2-3 printing of high and low cycle fatigue coupons was conducted by MolyWorks Materials Corporation at its Cloverdale facility. Fifteen E466 high cycle fatigue coupons and sixteen E606 low cycle fatigue coupons were produced. Horizontal build orientation was used for all samples. Blanks were printed, cut from build plates via band saw, and shipped to Quintus (Lewis Center, Ohio) for HIP and heat treatment. After heat treatment, coupons were machined to geometric specifications and sent to TRL for testing.

In both Example 1 and Example 2, heat treatments were selected to produce the highest-strength condition. A Hot Isostatic Press (HIP) was performed by Quintus at 1650 F and 15,000 psi for 2 hours, immediately followed by a solution treatment at 1410 F for 1h followed by a rapid argon quench. Some warping and surface oxidation was observed in the coupon blanks. The oxide layer was removed by subsequent machining. Warping was not significant enough to create problems during machining. A stress relief anneal performed while the parts are still attached to the build plate may be used in future tests to prevent warping.

In Example 1, after heat treatment, coupons were machined to final geometry and polished. In Example 2, control samples were also machined from Ti 10-2-3 ingot. Controls were cut from a Ti 10-2-3 round forged bar and blanked with an industrial saw. The ASTM E606 samples were rough turned on a large manual lathe and finish turned on a CNC lathe. The ASTM E466 samples were CNC milled to rough dimensions, finish ground, and polished. Once machining was completed, density testing was performed, and all coupons were sent to Touchstone Research Laboratory in Triadelphia, W. Va. for testing.

With respect to testing, the density of components was measured in-house using an Archimedes apparatus and an analytical balance. Samples were weighed in air and weighed again in distilled water. The temperature of the water was measured and recorded to correct for changes in water density. The samples were carefully inspected during weighing in water to ensure no bubbles were trapped underneath.

With respect to testing, fatigue tests were performed using test conditions that allow the results to be compared to literature data for conventional manufacturing processes. Load type was tension-tension using type-1 round bar with parallel gage length and R=0.1. Grips were wedge style. Results from both tests were used to generate stress-life and strain-life curves. Ti 10-2-3 fatigue data is not available from MMPDS; however, literature data is available which may be used for comparison.

Fatigue coupon fracture surfaces were viewed in a scanning electron microscope to assess the failure mode. While the surfaces of control samples contained dimples surfaces, the dimple morphology in the printed samples were smaller. The difference between the control samples and printed samples are evident in the morphology of the dimples, which can be attributed to the internal grain structure of the materials. Control samples have very small grain size, while with other printed samples the grain structure appears to be coarse. Typically, smaller grains and smaller feature sizes are associated with better fatigue performance.

Corrosion resistance testing was performed in a salt-spray cabinet conforming to ASTM B117. Testing temperatures were 95° F. in chamber, and 117° F. in the bubble tower (containing salt solution). Hot air bubbles were generated which passed through the bubble tower at 12 psi. A 5% salt solution (ASTM D1193, ACS grade salt) was atomized to produce fog in the chamber. Graduated cylinders were used to measure the amount of fog, with a 1-2 mL per hour target. pH was held within the range of 6.5-7.2. Samples were placed on wooden blocks during testing. No corrosion was visible in the Ti 10-2-3 samples upon completion of testing.

Samples were initially prepared for optical microscopy by sectioning using a circular table saw and mounting in resins for further preparation. Next, samples were ground and polished by standard metallographic specimen preparation procedures and etched with Kroil's reagent to reveal microstructure. Wrought material is typical beta with woven microstructure of alpha plates. The images reveal typical heat-treated titanium alloy with an average grain size of 20 am. Further internal structure of the grains consists of Widman Staten structure of alpha laths in a matrix of beta phase grain. The as-printed material showed larger elongated grains which contained fine precipitates (these may be V—Al or Ti—Al). Compared to the control material, the additively manufactured samples had very coarse grains.

Example 3

Figure 9:
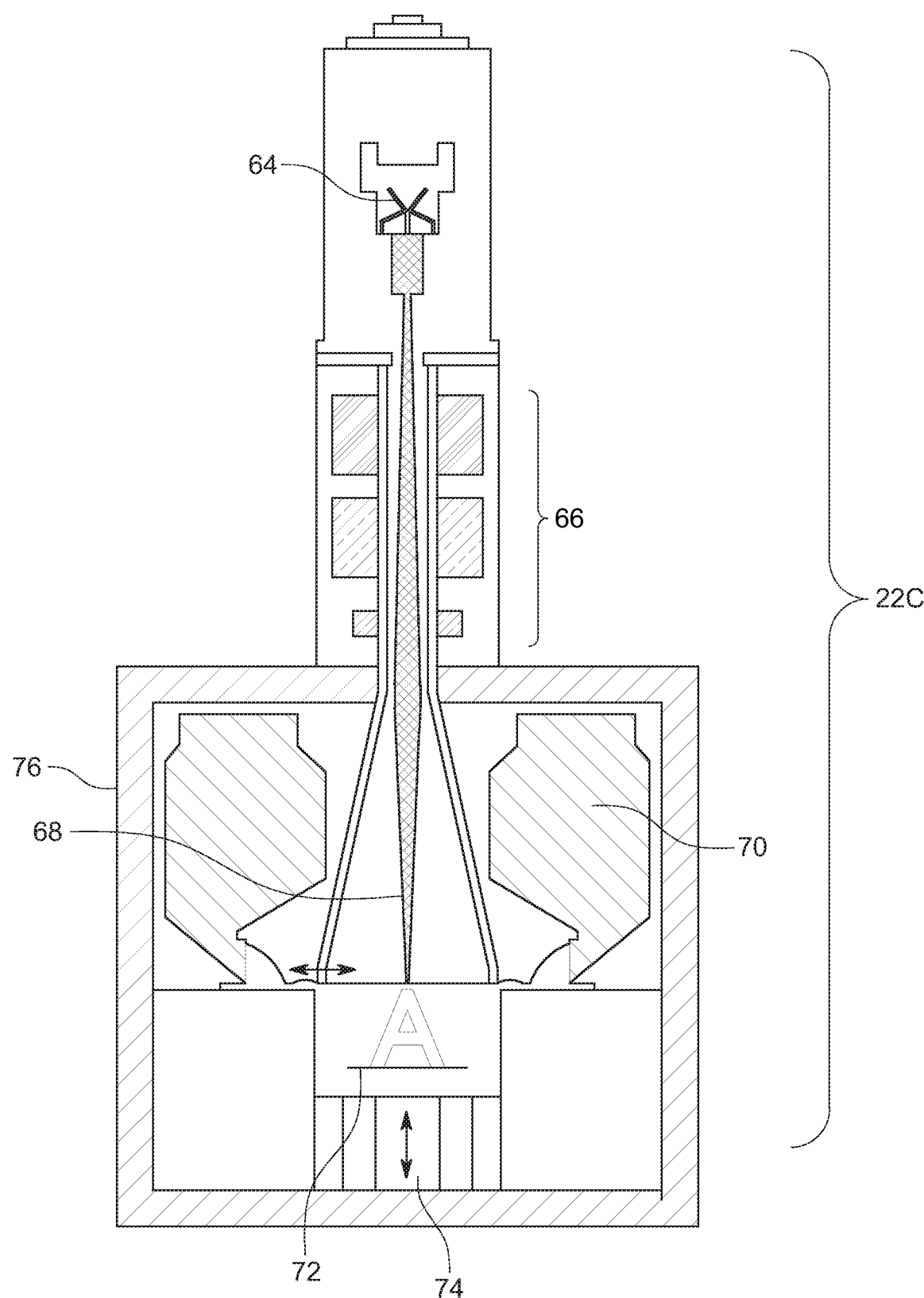
FIG. 9 is a schematic view illustrating an additive manufacturing system that includes an electron beam melting (EBM) system for performing a building step of the method.

In Example 3, the additive manufacturing system 22C (FIG. 9) can include electron beam melting (EBM) technology with the alloy powder 12 (FIG. 2D) produced to satisfy the requirements of this technology. As shown in FIG. 9, the additive manufacturing system 22C can include a filament 64 and a lens system 66 configured to produce an electron beam 68. The additive manufacturing system 22C can also include a build plate 72 on a build platform 74 in a vacuum chamber 76 wherein layers of melting powder can be formed into components. One suitable additive manufacturing system 22C that uses electron beam melting (EBM) is commercially available from Arcam EBM of Sweden.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A method for manufacturing metal components comprising:
    providing a waste feedstock having a predictable chemical composition;
    producing an additive manufacturing (AM) grade alloy powder from the waste feedstock using a cold hearth mixing process to produce a molten material and an atomization process of the molten material into the (AM) grade alloy powder, the (AM) grade alloy powder comprising a plurality of particles, each particle of the particles of the (AM) grade alloy powder having a particle size and a chemical composition,
    the cold hearth mixing process performed using a cold hearth mixing system comprising a heat source and a movable mixing cold hearth having fluid cooled walls and a melting cavity configured to hold the waste feedstock;
    providing an additive manufacturing system configured to perform an additive manufacturing process;
    controlling the producing of the (AM) grade alloy powder by controlling the cold hearth mixing process to produce the molten material with the chemical composition for each particle and by controlling the atomization process to produce the particle size of less than 350 um for each particle; and
    building the metal components using the (AM) grade alloy powder, the additive manufacturing system and the additive manufacturing process.
2. The method of claim 1 wherein the controlling the producing of the (AM) grade alloy powder includes a post-melt chemical analysis.

3. The method of claim 1 wherein the waste feedstock comprises an element selected from the group consisting of failed builds, broken parts, prototype parts, support structures, and used alloy powder.
4. The method of claim 1 wherein the waste feedstock comprises recycled aircraft components.
5. The method of claim 1 further comprising during the producing of the additive manufacturing (AM) grade alloy powder from the waste feedstock step, correcting the chemical composition of the waste feedstock using additives added during the cold hearth mixing process.
6. The method of claim 1 wherein the (AM) grade alloy powder comprises a titanium-based powder.
7. The method of claim 1 wherein the additive manufacturing system comprises a laser powder bed fusion (LPBF) system.
8. The method of claim 1 wherein the additive manufacturing system comprises a laser metal deposition (LMD) system.
9. The method of claim 1 wherein the additive manufacturing system comprises an electron beam melting (EBM) system.
10. A method for manufacturing titanium-based alloy components comprising:
    providing a waste feedstock having a predictable and correctable chemical composition;
    producing an additive manufacturing (AM) grade alloy powder from the waste feedstock using a cold hearth mixing process to produce a molten material and an atomization process of the molten material into the (AM) grade alloy powder, the (AM) grade alloy powder comprising a plurality of particles, each particle of the particles of the (AM) grade alloy powder having a particle size and an alloy powder chemical composition,
    the cold hearth mixing process performed using a cold hearth mixing system comprising a heat source and a movable mixing cold hearth having fluid cooled walls and a melting cavity configured to hold the waste feedstock,
    the producing of the (AM) grade alloy powder including a correcting of the chemical composition of the waste feedstock using additives added during the cold hearth mixing process such that the alloy powder chemical composition for each particle includes the additives;
    providing an additive manufacturing system configured to perform an additive manufacturing process;
    controlling the producing of the (AM) grade alloy powder by controlling the cold hearth mixing process to produce the molten material with the alloy powder chemical composition for each particle and by controlling the atomization process to produce the particle size for each particle of between 10-160 um; and
    building the titanium-based alloy components using the (AM) grade alloy powder, the additive manufacturing system and the additive manufacturing process.
11. The method of claim 10 wherein the additive manufacturing system comprises a laser powder bed fusion (LPBF) system and the (AM) grade alloy powder comprises a titanium alloy powder.
12. The method of claim 10 wherein the additive manufacturing system comprises a laser metal deposition (LIVID) system and the (AM) grade alloy powder comprises a titanium alloy powder.

13. The method of claim 10 wherein the additive manufacturing system comprises an electron beam melting (EBM) system and the (AM) grade alloy powder comprises a titanium alloy powder.

14. The method of claim 10 wherein the waste feedstock comprises an element selected from the group consisting of failed builds, broken parts, prototype parts, support structures, and used alloy powder.

15. The method of claim 10 wherein the waste feedstock comprises recycled aircraft components.

\* \* \* \* \*